United States Patent
Collin (10) Patent No.: US 12,543,927 B2
(45) Date of Patent: Feb. 10, 2026

(54) MEDICAL ENDOSCOPE VALVE

(71) Applicant: Advance Medical Integration Systems, Trégueux (FR)

(72) Inventor: Hervé Collin, Quintin (FR)

(73) Assignee: Advance Medical Integration Systems, Trégueux (FR)

( * ) Notice: Subject to any disclaimer, the term of this patent is extended or adjusted under 35 U.S.C. 154(b) by 357 days.

(21) Appl. No.: 18/004,785

(22) PCT Filed: Jul. 7, 2021

(86) PCT No.: PCT/FR2021/051259
§ 371 (c)(1),
(2) Date: Jan. 9, 2023

(87) PCT Pub. No.: WO2022/008844
PCT Pub. Date: Jan. 13, 2022

(65) Prior Publication Data
US 2023/0263370 A1     Aug. 24, 2023

(30) Foreign Application Priority Data
Jul. 10, 2020  (FR) ........................................ 2007350

(51) Int. Cl.
*A61B 1/00*        (2006.01)

(52) U.S. Cl.
CPC ...... *A61B 1/00068* (2013.01); *A61B 1/00103* (2013.01)

(58) Field of Classification Search
CPC ........................ A61B 1/00068; A61B 1/00103
See application file for complete search history.

(56) References Cited

U.S. PATENT DOCUMENTS

| | | | |
|---|---|---|---|
| 9,408,523 B2 | 8/2016 | Grudo et al. | |
| 9,585,545 B2 | 3/2017 | Anderson et al. | |
| 2012/0031515 A1 | 2/2012 | Whitaker | |
| 2015/0144215 A1 | 5/2015 | Bellofatto et al. | |
| 2015/0216393 A1 | 8/2015 | Toyoda | |
| 2017/0143194 A1 | 5/2017 | Wolfe | |
| 2020/0355281 A1* | 11/2020 | Harris | A61B 1/00068 |

FOREIGN PATENT DOCUMENTS

| | | |
|---|---|---|
| WO | 2012/175412 A1 | 12/2012 |
| WO | 2018/136274 A1 | 7/2018 |
| WO | 2019/072988 A1 | 4/2019 |
| WO | 2019/226307 A1 | 11/2019 |

OTHER PUBLICATIONS

International Search Report for Application No. PCT/FR2021/051259 dated Oct. 12, 2021, 3 pages.
International Written Opinion for Application No. PCT/FR2021/051259 dated Oct. 12, 2021, 6 pages.

* cited by examiner

*Primary Examiner* — Aaron B Fairchild
(74) *Attorney, Agent, or Firm* — TraskBritt

(57) ABSTRACT

A sterilizable medical endoscope valve comprises a central rod with an at least partially hollowed central channel opening onto one of the front surfaces and a head defining a seat for connecting to a fluid duct. The head and channel are joined by an elastic means. The assembly consists of a single part of unitary construction made of flexible, elastic polymer material.

11 Claims, 6 Drawing Sheets

MEDICAL ENDOSCOPE VALVE

CROSS-REFERENCE TO RELATED APPLICATIONS

This application is a national phase entry under 35 U.S.C. § 371 of International Patent Application PCT/FR2021/051259, filed Jul. 7, 2021, designating the United States of America and published as International Patent Publication WO 2022/008844 A1 on Jan. 13, 2022, which claims the benefit under Article 8 of the Patent Cooperation Treaty to French Patent Application Serial No. FR2007350 filed Jul. 10, 2020.

TECHNICAL FIELD

The present disclosure relates to plungers for endoscopes, which are medical instruments that serve to investigate the cavities of internal organs.

More precisely, the disclosure relates to the plungers, generally single-use, that control the flow of air or of water. The suction and insufflation/washing plungers are components comprising a plurality of parts of different types, in particular a cylindrical plunger, a body for mounting on the handle of an endoscope, and a spring inserted between the body and the plunger for ensuring the function of closing or opening the lumens provided in the body of the handle, as well as the return force allowing the user to exert the pressure in an ergonomic and controlled manner.

BACKGROUND

In the prior art, the U.S. Pat. No. 9,408,523 B2 is known, which describes a single-use air/water flow valve that may comprise a main rod allowing for passage of air through the central bore of the main rod. The main rod is molded and placed in a mold for overmolding the joints onto the main rod. Before the following steps, the retaining ring, the button cap, and the protective seal can be molded. The rear end of the main rod is placed through the center of the retaining ring and a resilient element (for example a spring). The button cap is then placed on the main rod and fixed thereto.

The U.S. Pat. No. 9,585,545 B2 relates to a single-use suction plunger. The single-use suction plunger comprises a rod that offers a passage of air through the rod, a spring, a spring stanchion cap, and a protective seal.

The method for producing a single-use suction plunger comprises a plurality of steps. A rod and a spring stanchion cap are molded, and a lower end of the rod is placed through the center of a spring. The lower end of the rod is placed through a rod opening in the spring stanchion cap, and the tabs or the spring stanchion cap are placed in the hollowed-out openings of the rod. The protective seal may be overmolded on the spring stanchion cap, or molded and placed on the spring stanchion cap.

The U.S. Patent Application Publication No. 2012/031515 describes a shutoff valve for a fluid line coupling. The shutoff valve comprises a housing and an integrally formed shutoff valve arranged inside the housing. The integrally formed shutoff valve has a spring region that defines a lumen, and a sealing feature on one or two ends. The spring region defines one or more fluid pathways between an outer surface and an inner surface of the integrally formed shutoff valve. The spring region may be in the form of a helical coil or a fenestrated tube. The sealing feature relates to a tight seal arranged between the housing and the integrally formed shutoff valve.

The document relates to a fluid connector that is intended for connecting two coaxial segments of tubular channels, and not to a plunger for an endoscope, or even a plunger in general.

International Patent Application Publication No. WO2012175412 describes a valve that comprises a recess defining a flow path between a first end and a second end of the recess. The valve further comprises a plunger device having a movable part, which can be moved from a closed position, in which the flow of liquid in the flow path is prevented, into an open position, in which the flow of liquid in the flow path is permitted. The movable part has a seal part designed to be placed against an inside sealing surface of the recess in the closed position of the plunger device. The plunger device further comprises a spring part that is designed to deflect the movable part toward the closed position. The spring part is an integral part of the plunger device.

U.S. Patent Application Publication No. 2015/144215 describes another example of an air/water valve assembly intended to be used in an endoscope or another item of medical equipment. The valve comprises a spool and a one-piece sealing member comprising a plurality of sealing rings. The coil can be injection-molded, and the sealing member can be overmolded onto the coil. A spring, a retaining member and a recess are also included in order to form the valve assembly. As such, an air/water valve assembly can be produced to be used in a single medical procedure and then disposed of in a cost-effective manner.

The solutions of the prior art consist in an assembly of metal (the spring) and plastic material (the body, the rod, and the support base) parts. The assembly of such parts requires essentially manual intervention, which is not particularly compatible with the preparation of sterile parts. They furthermore comprise connection zones that are difficult to sterilize. The sterilization is generally achieved by way of an ETO (ethylene oxide) sterilizer, over a time period sufficient for the gas to penetrate into all the cracks.

BRIEF SUMMARY

The present disclosure overcomes the disadvantages of the prior art by providing a plunger for an endoscope that is preferably single-use and disposable, easy to produce, has a reduced manufacturing cost, and provides ergonomic handling for the user, and provides a valve that can be sterilized using ETO.

According to its most general interpretation, the present disclosure relates to a plunger for ensuring the closing or opening function of lumens provided in the body of the handle of an endoscope, formed by:
   a rod having a central channel opening onto the proximal front surface on the one hand, and into a transverse channel on the other hand;
   an integrally molded button, formed by two coaxial annular skirts, the outer skirt comprising an annular base designed for engagement on the body of the handle, the skirts being connected by at least one elastically deformable connection so as to allow a relative axial movement between the skirts; and
   the inner skirt of the button being embedded on the proximal portion of the rod.

Preferably, the rod comprises overmolded joints on annular grooves. Preferably, the joints are lens-shaped and are formed of an overmolding material that is less hard than the material of the rod.

According to a preferred embodiment, the connection between the skirts is ensured by two diametrically opposed connections. Advantageously, the elastically deformable connection is formed by a curved tab, of which one of the transverse edges is rigidly connected to the outer skirt, and the other transverse edge is rigidly connected to the inner skirt.

According to a variant, the outer skirt comprises a peripheral lumen for allowing the lateral travel of the tab during the relative axial movement of the skirts.

According to a variant, the inner skirt also comprises a peripheral window, and the tab connects the transverse edge of the lumen of the annular outer skirt to the transverse edge of the lumen of the inner skirt.

Preferably, the plunger is designed to cooperate with the body of the suction valve of a handle of an endoscope. Advantageously, the plunger is designed to cooperate with the body, of the air/water valve of a handle of an endoscope.

The present disclosure also relates to a single-use assembly formed by a suction plunger and an air/water plunger for an endoscope, wherein each of the plungers is formed by:
  a rod having a central channel opening onto the proximal front surface on the one hand, and into a transverse channel on the other hand,
  an integrally molded button, formed by two coaxial annular skirts, the outer skirt comprising an annular base designed for engagement on the body of the handle, the skirts being connected by at least one elastically deformable connection so as to allow a relative axial movement between the skirts,
  the inner skirt of the button being embedded on the proximal portion of the rod.

The present disclosure also relates to a method for producing a single-use plunger for an endoscope, comprising:
  injecting, into a first molding cavity, a first elastomer plastic material in a mold for molding a rod having a central channel opening onto the proximal front surface on the one hand, and into a transverse channel on the other hand, and injecting a second elastomer plastic material into a mold for overmolding joints;
  injecting, into a second molding cavity, an elastomer plastic material for forming the inner skirt of the button; and
  embedding the button on the proximal portion of the rod.

Advantageously, the molding of the rod and the molding of the button are carried out during the same injection cycle, and the button is embedded on the proximal portion of the rod before cooling of the molded parts.

BRIEF DESCRIPTION OF THE DRAWINGS

Embodiments of the present disclosure are described below, by way of non-limiting example, with reference to the accompanying drawings, in which.

DETAILED DESCRIPTION

Figure 1:
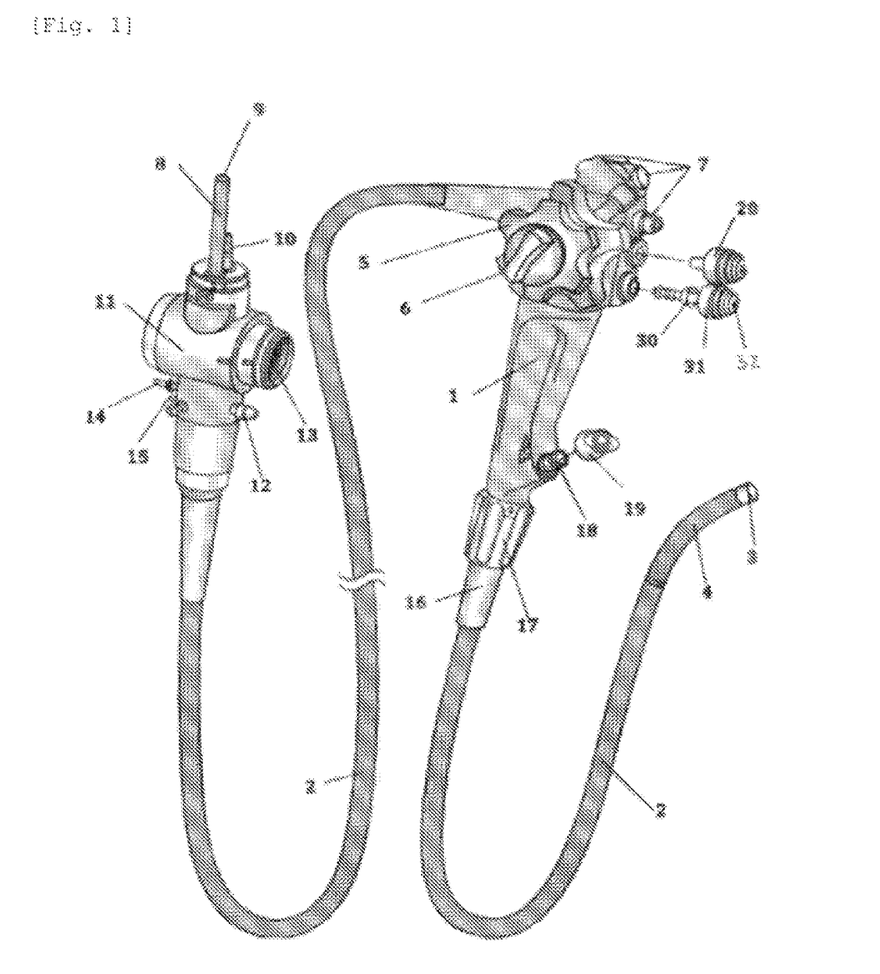
FIG. 1 is a partial, exploded, perspective view of an endoscope handle, comprising the plunger coupling to which the present disclosure relates.

FIG. 1 shows an example of a known endoscope. It comprises a handle (1), from which a flexible tube (2) extends, which is terminated by a distal or operating end (3) that is introduced into the cavity to be investigated, and the orientation of which can be controlled by a deflectable sleeve (4). The sleeve is controlled by wires that are pulled in a controlled manner following the manual actuation of plunger wheels or buttons (5, 6, 7) provided on the handle (1) of the endoscope. The control portion of the mobile levers allows the doctor to control all the functions of the endoscope. The deflection (orientation in space) levers or buttons (5, 6, 7) direct the deflection cables and control the deflectable portion at the distal end of the insertion tube, thus allowing for a two-dimensional orientation. Blocking mechanisms (brakes) make it possible to fix the deflectable portion in the desired position.

The light is transmitted by an optical fiber (8), the proximal end (9) of which is coupled to an optical connector. The connection unit (11) further comprises an air intake (10).

A pneumatic connection (12) is intended to be connected to a vacuum pump or a reversible air pump for controlling the insufflation or suction at the distal end (3). The technical unit (11) also comprises an electrical connector (13) and a connection support (14) of a safety line and a water supply (15).

The handle (1) is connected to the tube (2) by a sheath (16) extended by a sleeve (17). The handle comprises an opening of the operator channel (18) that is equipped with a disposable biopsy plunger valve (19).

The handle comprises an air/water plunger (20) that controls the washing channel, and a suction plunger (30) for controlling the suction or insufflation by way of two tubes extending between the handle (1) and the distal end (3), one for transporting air and water to the distal end, the other for performing a biopsy or suction. The suction application is controlled by way of a suction plunger (30) provided on the handle. The plunger is connected to an adjacent channel by welded connections. The plungers (20, 30) are coupled to the body of the handle by way of annular bases (32).

The suction plunger (30) connects the suction channel to the operator channel, in the insertion tube. By pressing the button (31) of the plunger, it is possible to perform suction of the operator channel. The air/water plunger (20) is comparable to the plunger and the suction plunger (30), except that a plunger comprising a button having two paths is used in a dual-channel device, which makes it possible to convey the air or the water as far as the lens at the distal end, for washing or insufflation of air, in order to improve the vision. The two plungers (20, 30) can be detached for replacement, when they are single-use, or otherwise for cleaning.

Detailed Description of the Plungers (20, 30)

Figure 2:
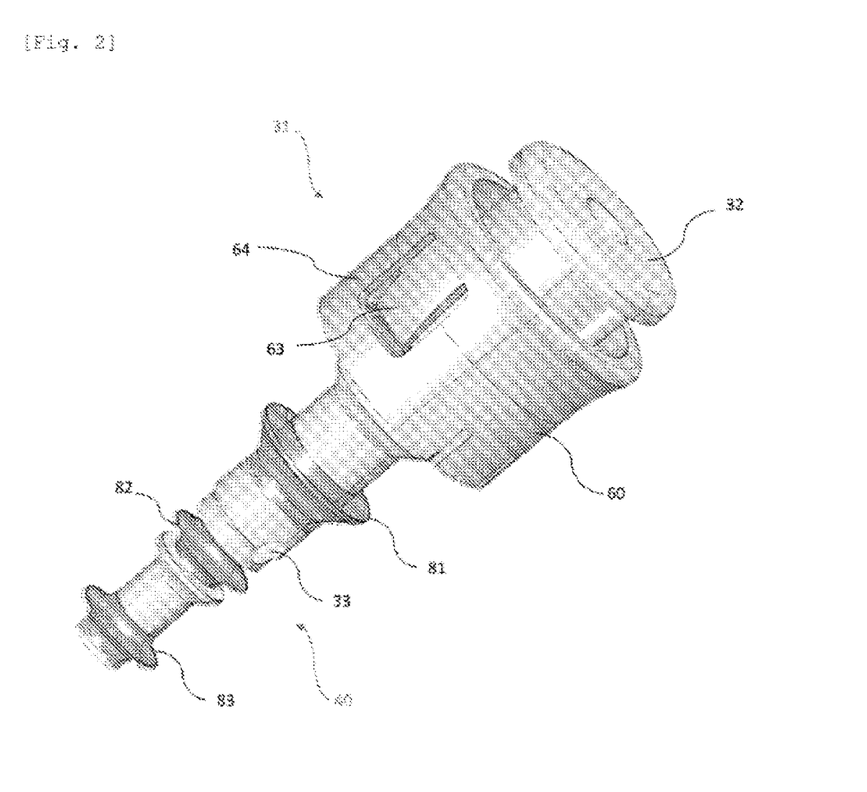
FIG. 2 is a perspective view of a suction plunger according to the present disclosure.
Figure 3:
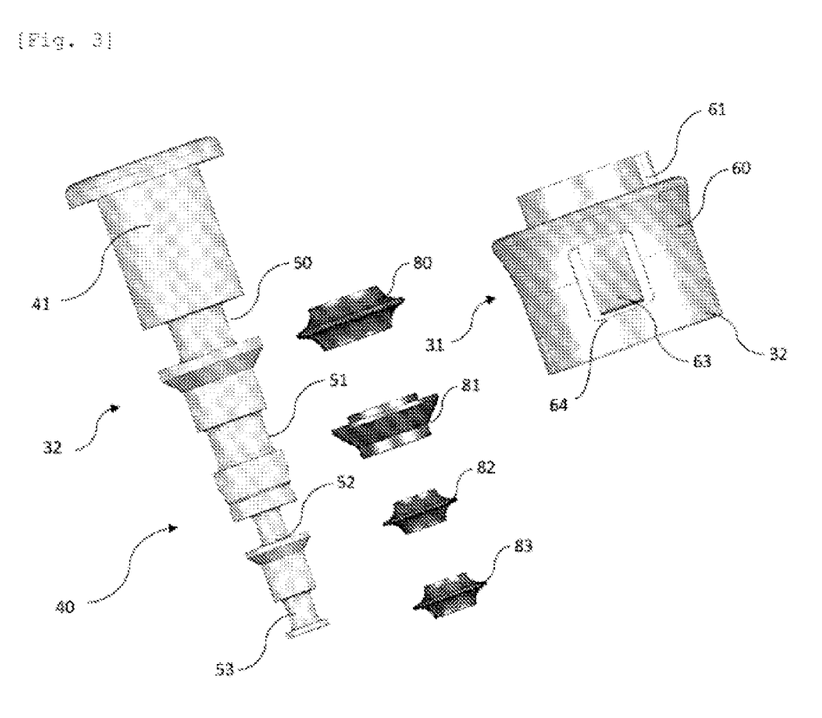
FIG. 3 is an exploded view of a suction plunger according to the present disclosure.
Figure 4:
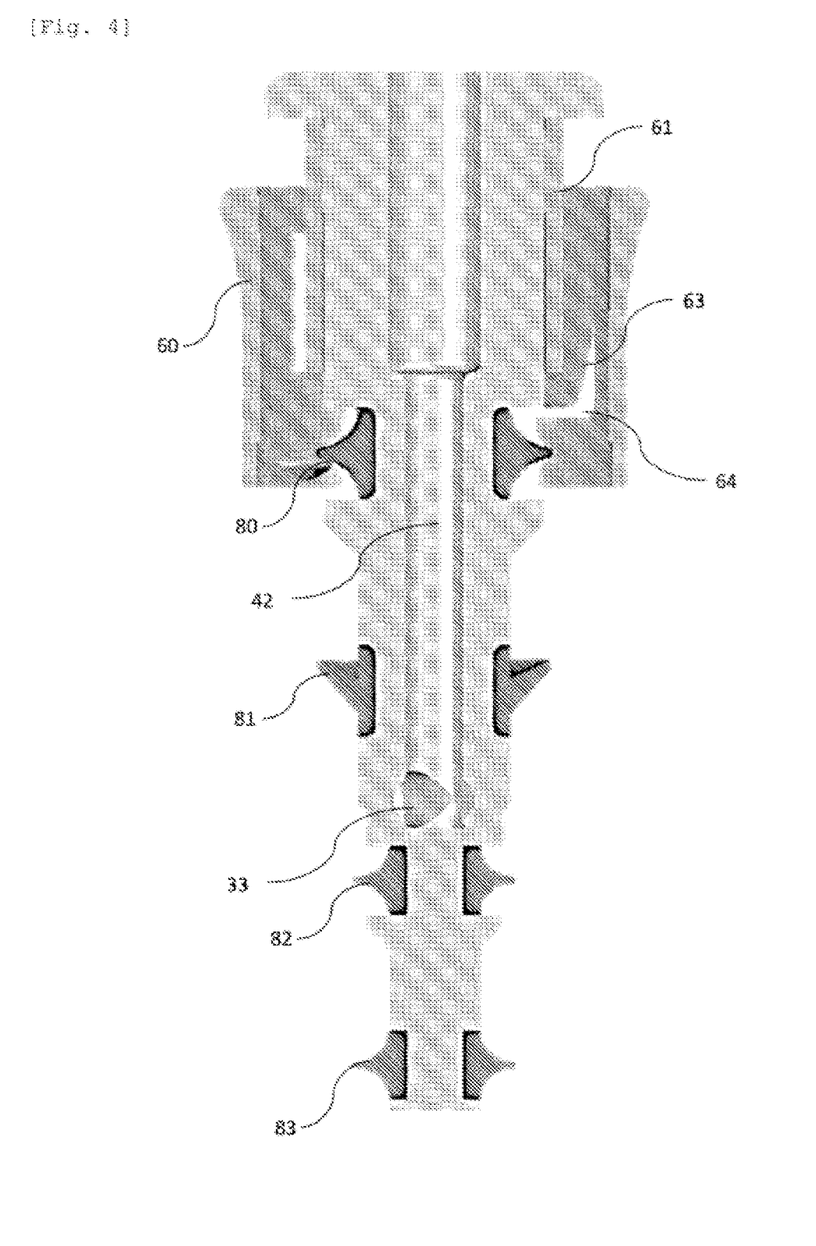
FIG. 4 is a cross-sectional view of a suction plunger according to the present disclosure.

FIGS. 2 to 4 are different views of a suction plunger according to the present disclosure. According to one aspect of the disclosure, the rod (40) of the plunger for an endoscope is made of molded synthetic plastic material and comprises a rectangular channel (42) that opens into a transverse channel (33). The part is cylindrical in shape, having a plurality of annular grooves (50 to 53) into which a second plastic material is then injected in order to form joints (80 to 83) by overmolding. The assembly thus forms an overmolded monolithic part, having the functions necessary for the tight closure and the opening of a channel provided in the endoscope. The rod (40) of the plunger is conventionally molded from polypropylene.

Figure 5:
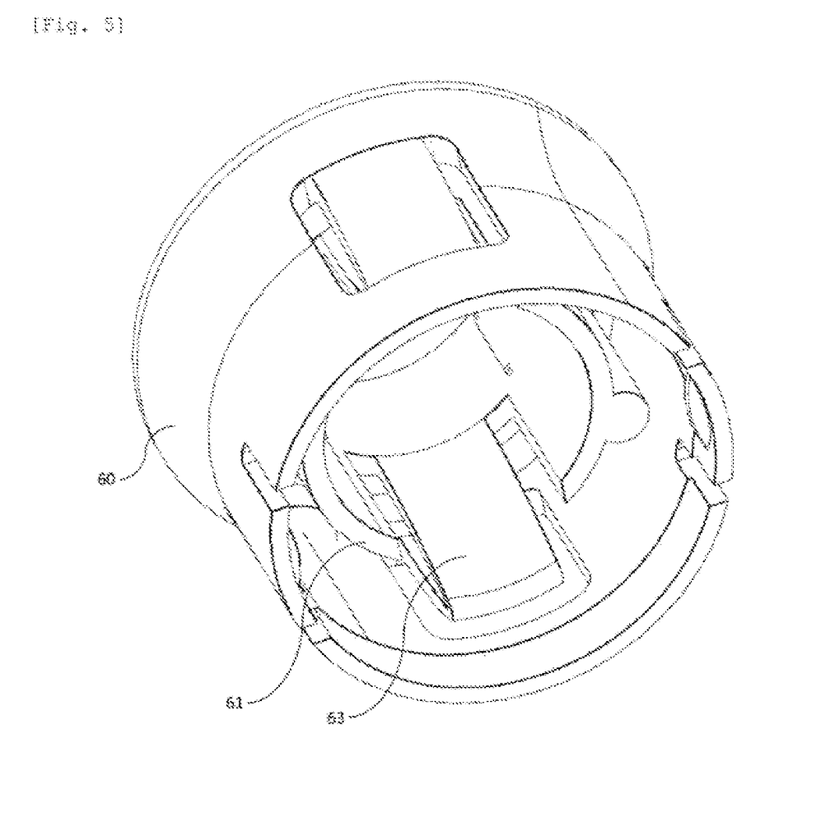
FIG. 5 is a perspective view of the button of a suction piston according to the present disclosure.
Figure 6:
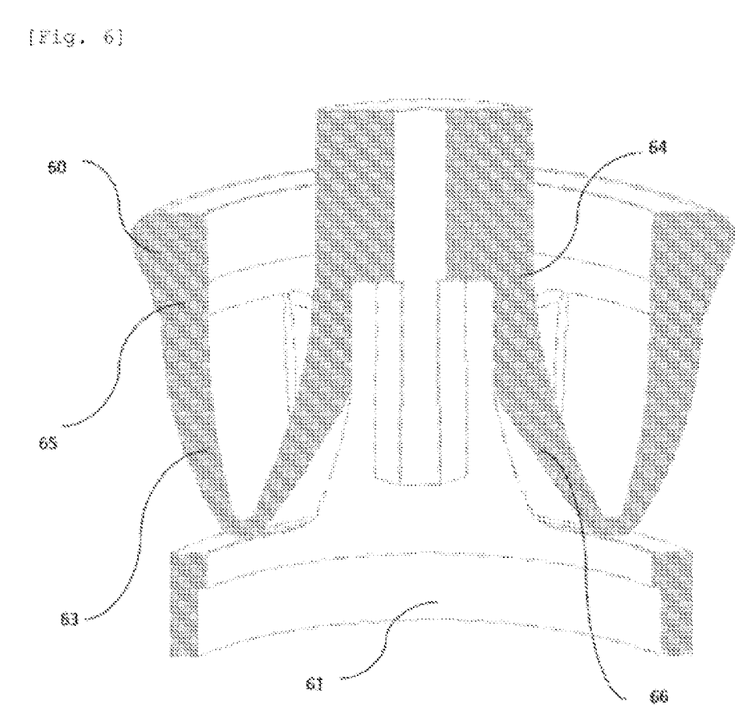
FIG. 6 is a cross-sectional view of the button of a suction plunger according to the present disclosure.

The button (31) constitutes a second monolithic part, also formed by molding. As can be seen in FIGS. 5 and 6, it comprises an annular outer skirt (60) and an annular inner skirt (61), which skirts are coaxial.

The two skirts (60, 61) are connected by two elastically deformable tabs (63) in order to allow a relative movement, according to an axial direction, of the two skirts (60, 61).

The elastically deformable tabs (63) are curved and are U-shaped, a first transverse edge (65) being connected to the annular outer skirt (60) and the second transverse edge (64) being connected to the annular inner skirt (61). The skirts comprise windows allowing for the travel of the tabs when a force is exerted on the button (31). The elastically deformable tabs (63, 66) form springs that ensure the resilient guiding of the button (31).

Production Method

The production of the plunger can be achieved by molding in a loose-detail mold, for molding of the rod (40), then the formation of joints (80 to 83) by overmolding with a second injection of a material less hard than that used for the injection of the core of the rod.

The button is formed during the same injection cycle, in a different mold. It is then moved by a robotic arm in order to be engaged on the rod (40) and embedded on the proximal portion, before cooling of the parts.

The plungers according to the disclosure can be combined in a sterile bag, in order to form a kit of single-use plungers.

The invention claimed is:

1. A plunger for ensuring a closing or an opening function of lumens provided in a body of a handle of a medical endoscope, comprising:
 a rod having a central channel opening onto a proximal front surface on the one hand, and into a transverse channel on the other hand; and
 an integrally molded button comprising two coaxial annular skirts, the two coaxial annular skirts including an annular outer skirt comprising an annular base designed for engagement on the body of the handle, the two coaxial annular skirts connected by at least one elastically deformable connection so as to allow a relative axial movement between the two coaxial annular skirts, the two coaxial annular skirts further including an annular inner skirt embedded on a proximal portion of the rod, the elastically deformable connection comprising a curved tab, one transverse edge of the curved tab being rigidly connected to the outer skirt, and another transverse edge of the curved tab being rigidly connected to the inner skirt.

2. The plunger of claim 1, wherein the rod comprises joints that are overmolded on annular grooves.

3. The plunger of claim 2, wherein the joints are lens-shaped and are made of an overmolding material that is less hard than a material of the rod.

4. The plunger of claim 1, wherein the at least one elastically deformable connection between the two coaxial annular skirts comprises two diametrically opposing connections.

5. The plunger of claim 1, wherein the outer skirt comprises a peripheral lumen allowing lateral travel of the curved tab during relative axial movement of the two coaxial annular skirts.

6. The plunger of claim 5, wherein the inner skirt also comprises a peripheral window, and wherein the curved tab connects a transverse edge of the peripheral lumen of the outer skirt to a transverse edge of a lumen of the inner skirt.

7. The plunger of claim 1, wherein the plunger is configured to cooperate with a suction valve body of the handle of the medical endoscope.

8. The plunger of claim 1, wherein the plunger is configured to cooperate with an air/water valve body of the handle of the medical endoscope.

9. A single-use assembly comprising a suction plunger and an air/water plunger for an endoscope, wherein each of the suction plunger and the air/water plunger comprises:
 a rod having a central channel opening onto a proximal front surface on the one hand, and into a transverse channel on the other hand; and
 an integrally molded button comprising two coaxial annular skirts, the two coaxial annular skirts including an annular outer skirt comprising an annular base configured for engagement on a body of a handle of the endoscope, the two coaxial annular skirts being connected by at least one elastically deformable connection so as to allow a relative axial movement between the two coaxial annular skirts, the two coaxial annular skirts further including an annular inner skirt embedded on a proximal portion of the rod, the elastically deformable connection comprising a curved tab, one transverse edge of the curved tab being rigidly connected to the outer skirt, and another transverse edge of the curved tab being rigidly connected to the inner skirt.

10. A method for producing a single-use plunger for an endoscope according to claim 1, comprising:
 injecting, into a first molding cavity, a first elastomer plastic material in a mold for molding a rod having a central channel opening onto the proximal front surface on the one hand, and into a transverse channel on the other hand, and injecting a second elastomer plastic material into a mold for overmolding joints;
 injecting, into a second molding cavity, an elastomer plastics material for forming the annular inner skirt of the integrally molded button; and
 embedding the integrally molded button on the proximal portion of the rod, so as to produce the plunger, the plunger including:
  the rod having the central channel opening onto the proximal front surface on the one hand, and into the transverse channel on the other hand; and
  the integrally molded button comprising two coaxial annular skirts, the two coaxial annular skirts including an annular outer skirt comprising an annular base designed for engagement on a body of a handle of an endoscope, the two coaxial annular skirts connected by at least one elastically deformable connection so as to allow a relative axial movement between the two coaxial annular skirts, the two coaxial annular skirts further including the annular inner skirt embedded on the proximal portion of the rod, the elastically deformable connection comprising a curved tab, one transverse edge of the curved tab being rigidly connected to the outer skirt, and another transverse edge of the curved tab being rigidly connected to the inner skirt; and
 assembling the plunger with a handle of a medical endoscope such that the plunger is configured for ensuring a closing or an opening function of lumens provided in a body of the handle.

11. The method of claim 10, wherein molding of the rod and molding of the integrally molded button are carried out during the same injection cycle, and wherein the integrally molded button is embedded on the proximal portion of the rod before cooling of the molded parts.

\* \* \* \* \*